United States Patent
Liu

(10) Patent No.: US 9,478,196 B2
(45) Date of Patent: Oct. 25, 2016

(54) DISPLAY METHOD AND DISPLAY DEVICE

(75) Inventor: Jinliang Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 125 days.

(21) Appl. No.: 13/701,099

(22) PCT Filed: Sep. 13, 2012

(86) PCT No.: PCT/CN2012/081354
§ 371 (c)(1),
(2), (4) Date: Feb. 12, 2013

(87) PCT Pub. No.: WO2013/044733
PCT Pub. Date: Apr. 4, 2013

(65) Prior Publication Data
US 2013/0207968 A1  Aug. 15, 2013

(30) Foreign Application Priority Data
Sep. 29, 2011 (CN) .......................... 2011 1 0294395

(51) Int. Cl.
*G09G 5/14* (2006.01)
*H04N 13/04* (2006.01)

(52) U.S. Cl.
CPC ............ *G09G 5/14* (2013.01); *H04N 13/0438* (2013.01); *H04N 13/0452* (2013.01); *H04N 13/0497* (2013.01)

(58) Field of Classification Search
CPC ............... G09G 5/14; H04N 13/0438; H04N 13/0452; H04N 13/0497; H04N 2800/2814; H04N 2800/2821; H04N 33/6896
See application file for complete search history.

(56) References Cited

U.S. PATENT DOCUMENTS 7,161,568 B2 *   1/2007   Park et al. ...................... 345/87
7,254,265 B2 *   8/2007   Naske et al. .................. 382/154
(Continued)

FOREIGN PATENT DOCUMENTS

CN   201319250 Y   9/2009
CN   101616279 A   12/2009
(Continued)

OTHER PUBLICATIONS

Robert Silva, "Video Frame Rate vs Screen Refresh Rate", Home Theater, May 22, 2007. http://hometheater.about.com/od/televisionbasics/qt/framevsrefresh.htm.*
Ou et al., English translated Chinese Patent Document CN101673528A (Published Mar. 17, 2010).*
(Continued)

*Primary Examiner* — Sing-Wai Wu
(74) *Attorney, Agent, or Firm* — Ladas & Parry LLP

(57) ABSTRACT

Embodiments of the present invention disclose a display method and a display device. 2D display is performed when an input source signal is a 2D image signal, and 3D display or 2D display is performed according to requirements and preferences of a user when the input source signal is a 3D image signal. Problems of blinking and tailing which are present in an existing display device are resolved, an edge blur phenomenon of images for fast motion pictures is illuminated, the "illusion" which is formed due to a visually temporary retention of human eyes is corrected, and picture stability is effectively improved; and a crosstalk phenomenon caused by simultaneous displaying of the left-eye image and the right-eye image in an existing active 3D technology is eliminated.

13 Claims, 4 Drawing Sheets

(56) References Cited

U.S. PATENT DOCUMENTS

| | | |
|---|---|---|
| 2005/0190170 A1* | 9/2005 | Shin .................... G09G 3/3648 345/204 |
| 2008/0117348 A1* | 5/2008 | Chen ............................ 349/46 |
| 2009/0207117 A1* | 8/2009 | Chen et al. .................... 345/96 |
| 2010/0053059 A1* | 3/2010 | Kim et al. ..................... 345/99 |
| 2010/0157024 A1 | 6/2010 | Park et al. |
| 2010/0225567 A1* | 9/2010 | Koebrich ................ G09G 3/20 345/55 |
| 2011/0007140 A1 | 1/2011 | Nakahata et al. |
| 2011/0205344 A1 | 8/2011 | Lee |
| 2011/0205346 A1* | 8/2011 | Taniguchi ..................... 348/56 |

FOREIGN PATENT DOCUMENTS

| | | |
|---|---|---|
| CN | 101673528 A | 3/2010 |
| CN | 101697595 A | 4/2010 |
| CN | 101763841 A | 6/2010 |
| CN | 101945298 A | 1/2011 |
| CN | 102163407 A | 8/2011 |
| WO | 2011/091273 A2 | 7/2011 |

OTHER PUBLICATIONS

Tien-Chu P. Hsu, Jung-Chieh L. Cheng, Ming-Tan T. Hsu and Szu-Fen F. Chen, "P-44: High Video Image Quality Technology: Dynamic Scanning Backlight with Black Insertion (DSBBI) Implemented in a 32" OCB-LCD TV," SID 07 Digest, 2007, pp. 353-355.*

Machine Translated Chinese document: CN201319250 Y by Chen, Dezheng.*

International Preliminary Report on Patentability dated Apr. 1, 2014; PCT/CN2012/081354.

International Search Report mailed Dec. 29, 2012; PCT/CN2012/081354.

Second Chinese Office Action Dated Jun. 13, 2014; Appln. No. 201110294395.7.

First Chinese Office Action dated Nov. 21, 2013; Appln. No. 2011102943957.

Third Chinese Office Action Appln. No. 201110294395.7; Dated Dec. 4, 2014.

Chinese Rejection Decision dated May 7, 2015; Appln. No. 201110294395.7.

* cited by examiner

DISPLAY METHOD AND DISPLAY DEVICE

TECHNICAL FIELD

Embodiments of the present invention relates to a display method and a display device.

BACKGROUND

With development of three-dimensional (3D) display technologies and increase of 3D imaging contents, consumers have increasingly great interests in products capable of achieving 3D display, and there is an increasingly thriving demand. Currently, a relatively mature method for achieving 3D display is: image information, with parallax between left and right eyes from a display device, is respectively received by the left and right eyes with 3D polarized glasses or 3D shutter glasses, and different image information with parallax is processed by a brain after it has received the information so as to obtain a stereoscopic sensation.

However, as 3D image resources are small at present, use ratio of a display device only for performing 3D display is low, and a display device with market competition is preferably a display device which is capable of displaying not only a two-dimensional (2D) image but also a 3D image, and can perform display by converting a 3D image signal into a 2D image signal according to requirements of a client.

The inventors in the course of research have found that an existing 2D video display technology has a relatively severe video streaking phenomenon, which leads to a dynamic imaging blur of an image, and affects a good viewing feeling of a user.

Meanwhile, the inventors have also discovered that a main problem to implement the 3D display technology using 3D shutter glasses lies in that, a crosstalk phenomenon tends to occur in the scanning courses of left-eye and right-eye images, i.e., during the scanning and displaying of the left-eye image, a part of the right-eye image of a preceding frame may be viewed by the left eye, and likewise, during the scanning and displaying of the right-eye image, a part of the left-eye image of a preceding frame may be viewed by the right eye. Thus, users may tend to feel tired for eyes after long time viewing.

SUMMARY

The technical problems intended to be resolved by embodiments of the present invention is to provide a display method and a display device, wherein 2D display is performed when an input source signal is a 2D image signal, and 3D or 2D display is performed according to requirements and preferences of a user when the input source signal is a 3D image signal. Further, the display method and the device therefor can enhance the display effect of an image during displaying, reduce a streaking phenomenon of the image, and relief a visual fatigue of the user.

According to an embodiment of the present invention, there is provided a display method, comprising: providing a source image signal and judging whether the source image signal is a two-dimensional (2D) signal or a three-dimensional (3D) signal; performing a frame doubling process on the source image signal and inserting a black picture at the end of displaying each frame of image, when it is judged that the source image signal is a 2D image signal; and when it is judged that the source image signal is a 3D image signal, performing an image decomposition and identification on the source image signal, judging whether 3D display or 2D display is selected by a user, performing 3D stereoscopic display in combination with 3D shutter glasses if 3D display is selected; and converting the source image signal subject to the image decomposition and identification into the 2D image signal, performing the frame doubling process and inserting a black picture at the end of displaying each frame of image if 2D display is selected.

For example, upon the performing of the 3D stereoscopic display in combination with the 3D shutter glasses, when a left-eye image for a frame of 3D image is displayed, four timings are included: at a first timing, in which a left-eye glass and a right-eye glass both are in an off state, and a display device starts to scan and display the left-eye image of a present frame; at a second timing, in which the left-eye glass is turned on, the right-eye glass is in the off state, and the display device continues to scan and display the left-eye image of the present frame; at a third timing, in which the left-eye glass is in an on state, the right-eye glass is in the off state, and the display device completes scanning of the left-eye image of the present frame and continues to display the left-eye image of the present frame; and at a fourth timing, in which the left-eye glass and the right-eye glass both are in the off state, and the display device displays a black picture.

For example, upon the performing of the 3D stereoscopic display in combination with the 3D shutter glasses, when a right-eye image for the frame of 3D image is displayed, four timings are included: at a fifth timing, in which a left-eye glass and a right-eye glass both are in an off state, and a display device starts to scan and display the right-eye image of a present frame; at a sixth timing, in which the left-eye glass is in the off state, the right-eye glass is turned on, and the display device continues to scan and display the right-eye image of the present frame; at a seventh timing, in which the left-eye glass is in the off state, the right-eye glass is in an on state, and the display device displays the right-eye image of the present frame's image; and at an eighth timing, in which the left-eye glass and the right-eye glass both are in the off state, and the display device displays a black picture.

For example, display duration for one frame of 3D image is smaller than or equal to a 1/60 second.

According to another embodiment of the present invention, there is provided a display device, comprising: a judgment unit for judging whether a source image signal is a 2D image signal or a 3D image signal; a 3D image signal processing unit for performing an image decomposition on the source image signal and identifying as a left-eye image signal and a right-eye image signal, when it is judged that the source image signal is the 3D image signal; a selecting unit for selecting display with the 3D image signal or a display with the 2D image signal, when it is judged that the source image signal is the 3D image signal; and a display unit for performing 3D stereoscopic display by using the 3D image signal, which has been processed by the 3D image signal processing unit, in combination with 3D shutter glasses, or for performing a frame doubling process on the source image signal which is judged as the 2D image signal or the source image signal which is converted into a 2D image signal from the 3D image signal, and inserting a black picture at the end of displaying of each frame's 2D picture.

For example, the display device may further comprise: a 2D-image frame-doubling-process module for performing the frame doubling process on the source image signal which is judged as the 2D image signal or the source image signal which is converted into a 2D image signal from the 3D image signal; and a black-insertion controlling module for inserting the black picture at the end of displaying of each frame's 2D picture.

For example, the display device may further comprise: a 3D-image-to-2D-image conversion module for converting the source image signal, which is judged as the 3D image signal and is subject to the decomposition and the identification, into the 2D image signal.

For example, the black-insertion controlling module is also used to insert a black picture at the end of displaying of a left-eye image or a right-eye image of each frame upon the performing of the 3D display.

For example, the display device may further comprise: the 3D shutter glasses for receiving a synchronization controlling signal provided by a clock controlling module and identification information for discerning the left-eye image signal and the right-eye image signal, and performing a shutter switching operation between a left-eye glass and a right-eye glass according to the identification information for the left-eye image signal and the right-eye image signal.

For example, the refreshing rate of the display device is larger than or equal to 120 Hz.

According to the technical solutions provided by embodiments of the present invention, there is provided a display method and a device therefor, which increase the utilization ratio of a 3D stereoscopic display device in the current case where 3D image resources are small, to enhance market demands for the 3D stereoscopic display device and form a basis for fully spreading of the 3D display technology, as compared to the prior art. Further, the frame doubling and black insertion technologies adopted by the display method in performing 2D display resolve problems of blinking and tailing which are present in an existing display device, illuminate an edge blur phenomenon of images for fast motion pictures, correct the "illusion" which is formed due to a visually temporary retention of human eyes, and effectively improve picture stability. The black insertion technology which is adopted in performing 3D display for inserting a black picture between the left-eye image and right-eye image of each frame eliminates a crosstalk phenomenon caused by simultaneous displaying of the left-eye image and the right-eye image in an existing active 3D technology.

BRIEF DESCRIPTION OF THE DRAWINGS

In order to illustrate the technical solution of the embodiments of the invention more clearly, the drawings of the embodiments will be briefly described in the following; it is obvious that the described drawings below are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, every other embodiment, which can be obtained by those skilled in the art without any inventive work, should be within the scope of the invention.

Embodiment 1

According to an embodiment 1, there is provided a display method, and the display method comprises the following.

A source image signal is provided and it is judged whether the source image signal is a 2D signal or a 3D signal.

When it is judged that the source image signal is a 2D image signal, a frame doubling process is performed on the source image signal and a black picture is inserted at the end of displaying the image of each frame, and 2D display is performed.

When it is judged that the source image signal is a 3D image signal, an image decomposition and identification is performed on the source image signal; it is judged whether 3D display or 2D display is selected by a user, if 3D display is selected, a 3D stereoscopic display is performed in combination with 3D shutter glasses; and if 2D display is selected, the source imaged signal subject to the image decomposition and identification is converted into a 2D image signal, a frame doubling process is performed and a black picture is inserted at the end of displaying the image of each frame, and the 2D display is performed.

Figure 1:
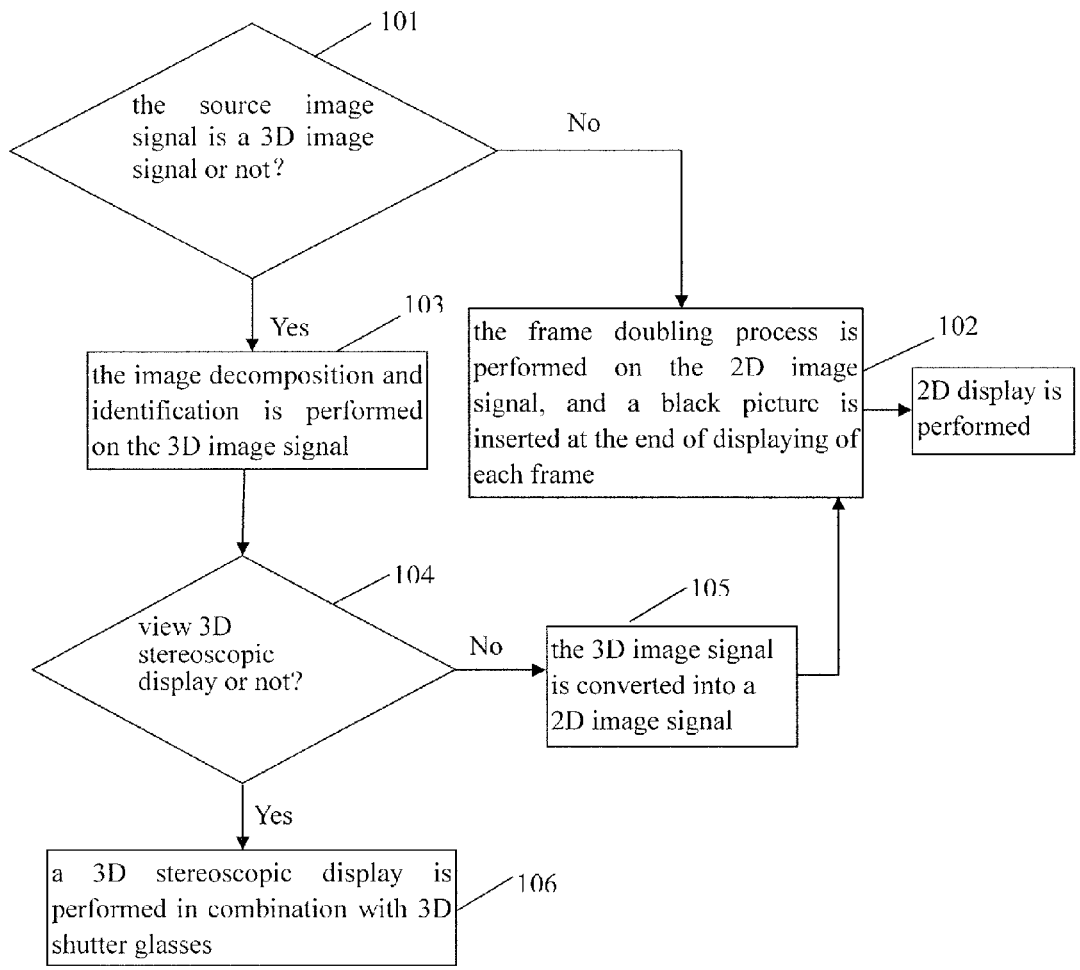
FIG. 1 is a flow chart illustrating a display method in an embodiment of the present invention.

In the embodiment 1 of the invention, as shown in FIG. 1, steps of an exemplary method are as follows:

Step 101: a judgment is performed on the source image signal to determine whether the source image signal is a 3D image signal or not. If it is judged that the source image signal is a 2D image signal, a step 102 is performed; and if it is judged that the source image signal is a 3D image signal, a step 103 is performed.

Step 102: the frame doubling process is performed on the 2D image signal, and a black picture is inserted at the end of displaying of each frame. Then, 2D display is performed.

In the embodiment, for example, the frame doubling process on the source image signal can be performed by using a Motion Estimate and Motion Compensation (MEMC) technology, i.e., by using a moving imaging system, in which a motion compensation frame is inserted between the images of two frames, a refreshing rate of 50 Hz/60 Hz for a common display device is increased, for example, to 100 Hz/120 Hz, and a display device, of which the refreshing rate is larger than or equal to 120 Hz, for example, is used, to thereby enable motion pictures to be more clear and fluent. Based on this, insertion of a black picture at the end of displaying the image of each frame resolves the problems regarding blinking and tailing which are present in a display device, eliminates an edge-blur phenomenon of images for fast motion pictures, corrects the "illusion" which is formed due to a visually temporary retention of human eyes, and effectively improves picture stability.

Step 103: the image decomposition and identification is performed on the 3D image signal.

Current mainstream technologies for 3D stereoscopic display include an active shutter type technology and a polarized glasses technology, and embodiments of the present invention are based on, e.g., the active shutter type technology. The active shutter type technology divides one 3D image of each frame into two, and two groups of pictures corresponding to a left eye and a right eye are obtained and are continually displayed in an alternate manner. Meanwhile, corresponding pictures can be seen by left and right eyes at proper timings by synchronously controlling shutters of a left-eye glass and a right-eye glass of 3D shutter glasses. Due to visual delay of human eyes, a differentiated imaging for the left and right eyes results in a 3D effect eventually. For the purpose of enabling the shutters of the left-eye glass and the right-eye glass for the 3D shutter glasses to be turned-on and -off correctly to allow a correct picture be seen by the user, a left-eye image signal and a right-eye image signal of a 3D source image signal for each frame is decomposed and identified correspondingly upon input of the 3D source image signal, which assures that a 3D display device can correctly "notify" the 3D shutter glasses to turn on the corresponding left-eye glass or right-eye glass when scanning and displaying a left-eye image or a right-eye image for each frame, and guarantees a correct image output.

Step 104: The user selects whether to view 3D stereoscopic display according to a pop-up notification (e.g., a prompt window). If the user selects to view 3D stereoscopic display, a step 106 is performed; and if the user selects not to view 3D stereoscopic display, a step 105 is performed.

The user can select whether to view the 3D stereoscopic display according to his preferences. This humanized devise broadens the application scope of the present invention, and can increase the utilization ratio of a current 3D stereoscopic display device in the case in which 3D image resources are small, thereby enhancing the market demands for 3D stereoscopic display devices.

Step 105: the 3D image signal is converted into a 2D image signal, and the step 102 is performed. Then, 2D display is performed.

One 3D image of each frame can be practically decomposed into a 2D left-eye image corresponding to the frame and a 2D right-eye image corresponding to the frame. Because there is a distance (with an average value of 6.5 cm) between two eyes of a human, left and right eyes have different relative positions with respect to the same object, which produces a binocular parallax, i.e., what are watched by the left and right eyes are images with difference therebetween. In the embodiments of the present invention, for example, there are the following two methods for converting the 3D source image signal into the 2D image signal.

Method 1

Only the left-eye image or only the right-eye image corresponding to the 3D image of each frame is extracted for display. Because there is only a slight difference between the left-eye image and the right-eye image corresponding to the 3D image of each frame, extracting the left-eye image or the right-eye image for each frame alone for display will not affect a desirable 2D display effect.

Method 2

A synthetic operation processing is performed on the left-eye image and the right-eye image for the 3D image of each frame to generate a 2D image of the corresponding frame. For example, an arithmetic average is performed on the left-eye image and the right-eye image to obtain one frame of 2D image.

As seen from the above two exemplary methods, after the 3D source image signal is converted into a 2D image signal, the frequency of the 2D image signal is half of that of the 3D source image signal. In the embodiment, because a 3D stereoscopic effect needs to be shown in combination with 3D shutter glasses, and the 3D shutter glasses achieves the 3D effect mainly by increasing the fast refreshing rate (at least up to 120 Hz) of pictures, after conversion of the 3D source image signal into the 2D image signal, the refreshing rate of the 2D image signal after conversion is still larger than or equal to 60 Hz. Then, the frame doubling process is performed on the resultant 2D image signal, and a black picture is inserted at the end of displaying the image of each frame, the refreshing rate of the 2D image signal after inversion can be remarkably increased. Thus, problems of blinking and tailing which are present in a display device are resolved, an edge-blur phenomenon of images for fast motion pictures is eliminated, the "illusion" which is formed due to a visually temporary retention of human eyes is corrected, and picture stability is effectively improved.

Step 106: a 3D stereoscopic display is performed in combination with 3D shutter glasses.

Further, display duration for one frame of 3D image is less than or equal to a 1/60 second. As seen from the foregoing analysis, the 3D stereoscopic effect of the embodiment needs to be shown in combination with the 3D shutter glasses, and the 3D shutter glasses achieves the 3D effect mainly by increasing the fast refreshing rate (at least up to 120 Hz) of pictures, while it is necessary that corresponding left-eye and right-eye images of two frames, which have a certain parallax therebetween, are used in coordination to display the 3D image of each frame. Therefore, in order to make sure that a user sees a continual 3D display effect without blinking, display duration for one frame of 3D image should be usually less than a 1/60 second, i.e., images at a frequency of 60 Hz or more are received by each of left and right eyes.

According to the technical solutions of the embodiment, there is provided a display method, which can increase the utilization ratio of a 3D stereoscopic display device in the case in which at present 3D image resources are small, to thereby enhance market demands for the 3D stereoscopic display device and form a basis for fully spreading of the 3D display technology. Moreover, the frame doubling and black insertion technologies adopted by the display method in performing 2D display resolve problems of blinking and tailing which are present in an existing display device, illuminate an edge blur phenomenon of images for fast motion pictures, correct the "illusion" which is formed due to a visually temporary retention of human eyes, and effectively improve picture stability. The black insertion technology, which is adopted in performing 3D display, for inserting a black picture between the left-eye image and the right-eye image of each frame eliminates a crosstalk phenomenon caused by simultaneous displaying of the left-eye image and the right-eye image in an existing active 3D technology.

Embodiment 2

Figure 2:
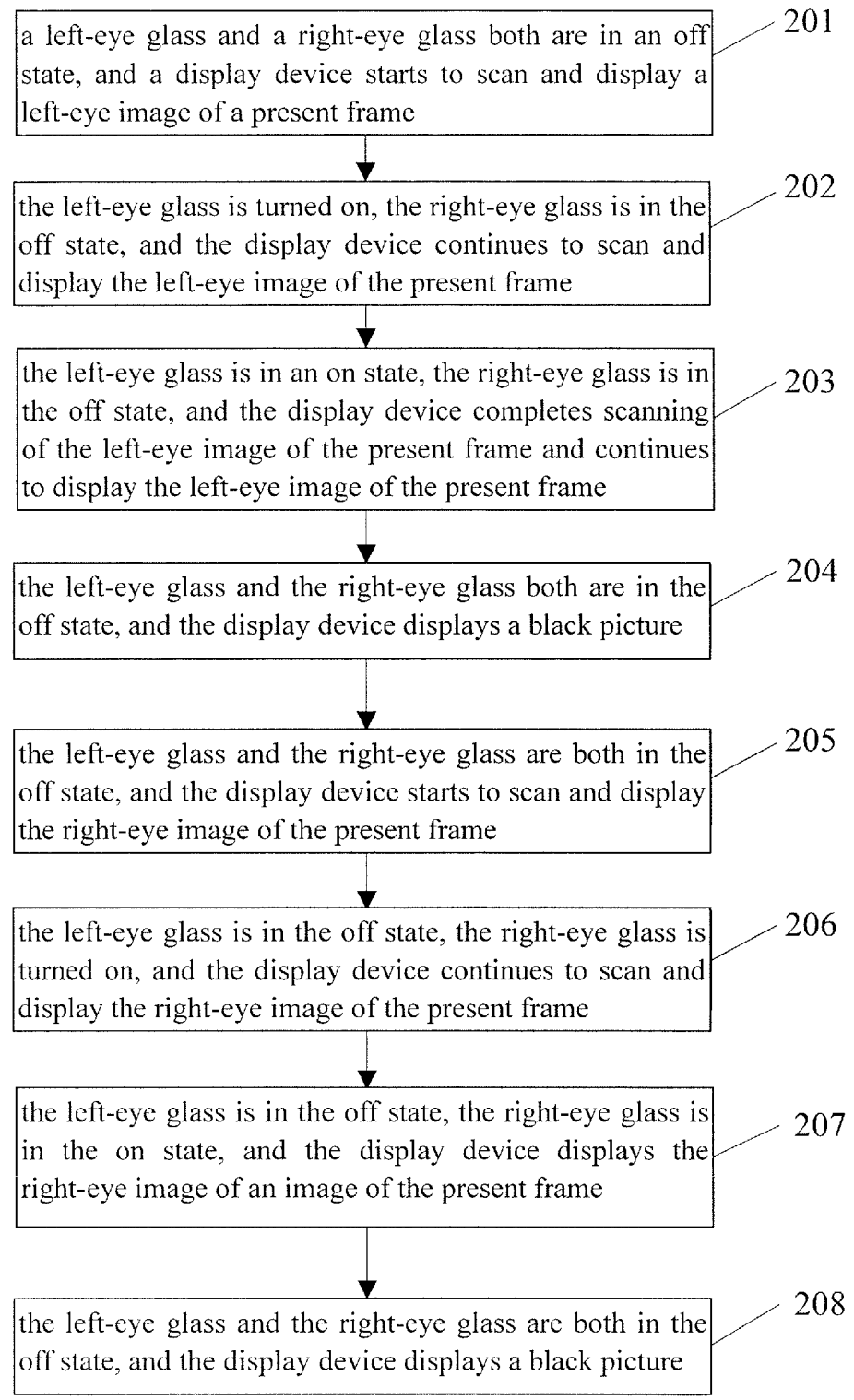
FIG. 2 is a flow chart illustrating 3D stereoscopic display steps in an embodiment of the present invention.

According to an embodiment 2 of the present invention, there is provided a display method, which is a 3D stereoscopic display method. As shown in FIG. 2, the display method comprises the following.

When a source image signal has been subject to image decomposition and identification and 3D stereoscopic display is performed in combination with 3D shutter glasses, the display for one frame of 3D image can include eight timings:

Step 201: at a first timing, in which a left-eye glass and a right-eye glass both are in an off state, and a display device starts to scan and display a left-eye image of a present frame.

Step 202: at a second timing, in which the left-eye glass is turned on, the right-eye glass is in the off state, and the display device continues to scan and display the left-eye image of the present frame.

Step 203: at a third timing, in which the left-eye glass is in an on state, the right-eye glass is in the off state, and the display device completes scanning of the left-eye image of the present frame and continues to display the left-eye image of the present frame.

Step 204: at a fourth timing, in which the left-eye glass and the right-eye glass both are in the off state, and the display device displays a black picture.

The scanning of the display device is, for example, a progressive scanning or an interlaced scanning from top to bottom, and thus an image is line-by line shown downward from an upper part of the screen of the display device. For this reason, upon viewing by naked eyes, vision of human eyes is stimulated by the upper part of the image displayed on the screen for a relative longer time period than the lower part, so that the user will feel that the display luminance is non-uniform for the upper and lower parts of the screen, the viewing effect of the user is adversely affected and visual fatigue of the user easily occurs. In the embodiment of the present invention, after the display device starts to scan and display the left-eye image of the present frame for a period of time (i.e., time difference between the second timing and the first timing), the left-eye glass is turned-on, so that most information of the left-eye image can be received by the human eye at the moment of turning-on of the left-eye glass. Thus, a phenomenon that, the luminance for the upper and lower parts of the screen felt by the user's vision is non-uniform, can be relieved. If the time difference between the second timing and the first timing is properly prolonged, the phenomenon that, the luminance for the upper and lower parts of the screen felt by the user's vision is non-uniform, can be further relieved.

At the fourth timing after the display device completes scanning of the left-eye image of the present frame and continues to display the left-eye image of the present frame, the left-eye glass and the right-eye glass are both in the off state, displaying of a black picture by the display device can shorten a vision temporary retention duration for the displayed image of the present frame, so that the display device starts to scan and display a right-eye image signal of the next frame only if a left-eye image signal disappears completely, and a crosstalk phenomenon caused by simultaneous display of the left-eye image and the right-eye image in an active type 3D technology of prior art is eliminated.

Step 205: at a fifth timing, in which the left-eye glass and the right-eye glass are both in the off state, and the display device starts to scan and display the right-eye image of the present frame.

Step 206: at a sixth timing, in which the left-eye glass is in the off state, the right-eye glass is turned on, and the display device continues to scan and display the right-eye image of the present frame.

Step 207: at a seventh timing, in which the left-eye glass is in the off state, the right-eye glass is in the on state, and the display device displays the right-eye image of an image of the present frame.

Step 208: at a eighth timing, in which the left-eye glass and the right-eye glass are both in the off state, and the display device displays a black picture.

Similar to the turning-on manner of the left-eye glass, after the display device starts to scan and display the right-eye image of the present frame for a period of time (i.e., time difference between the sixth timing and the fifth timing), the right-eye glass is turned-on, so that most information of the right-eye image can be received by the human eye at the moment of turning-on of the right-eye glass. Thus, a phenomenon that, the luminance for the upper and lower parts of the screen felt by the user's vision is non-uniform, can be relieved. By properly prolonging the time difference between the sixth timing and the fifth timing is properly prolonged, the phenomenon that, the luminance for the upper and lower parts of the screen felt by the user's vision is non-uniform, can be further relieved.

At the eighth timing after the display device completes scanning of the right-eye image of the present frame and continues to display the right-eye image of the present frame, the left-eye glass and the right-eye glass are both in the off state, displaying of a black picture by the display device can shorten a vision temporary retention duration for the displayed image of the present frame, so that the display device starts to scan and display a left-eye image signal of the next frame only if a right-eye image signal disappears completely, and a crosstalk phenomenon caused by simultaneous display of the left-eye image and the right-eye image in the existing active type 3D technology is eliminated.

According to the technical solution of the embodiment, there is explained in detail a procedure to implement the 3D stereoscopic display of the display method, which can solve a problem that, vision of human eyes is stimulated by the upper part of the image displayed on the screen for a relative longer time period than the lower part so that a user feels that the display luminance for the upper and lower parts of the screen is non-uniform, the viewing effect of the user is adversely affected and visual fatigue of the user easily occurs; and which can eliminate a crosstalk phenomenon caused by simultaneous display of the left-eye image and the right-eye image in the existing active type 3D technology by means of inserting a black picture between displaying of the left-eye image and the right-eye image to shorten a vision temporary retention duration for the displayed image of the present frame, thereby further improving the viewing effect of the user.

Embodiment 3

According to an embodiment 3 of the present invention, there is provided a display device. The display device comprises: a video decoding unit 11, a judgment unit 12, a 3D image signal processing unit 13, a selecting unit 14 and a display unit 15.

The video decoding unit 11 acts to decode the source image signal. A main challenge to the digital video at present lies in that, original or non-compressed video needs storage or transmission of large amounts of data. Obviously, it is necessary that a compression technology be used for the storage or transmission of digital video. An object of the video compression is to encode the digital video for occupying space as less as possible as well as maintaining video quality.

The video decoding unit is a unit or program capable of decompressing the digital video. In the daily life, applications of the video encoding and video decoding are very wide. For example, they are applied in DVD (MPEG-2), VCD (MPEG-1), and various satellite and terrestrial television broadcast system, and on the internet. On-line materials of video and images are usually compressed by using many types of different encoding units. Consequently, in the embodiments of the present invention, for the purpose of enabling a user to properly view these materials, the video decoding unit is added to decompress the acquired materials of video image.

The judgment unit 12 acts to judge whether the source image signal is a 2D image signal or a 3D image signal. The corresponding processing method and display method when the input source signal is the 2D image signal or the 3D image signal are different, and therefore the display device makes an judgment of the source image signal before display and performs a further corresponding processing on the source image signal, thereby assuring that a satisfactory image can be seen by the user.

The 3D image signal processing unit 13 acts, when it is judged that the source image signal is the 3D image signal, to perform an image-decomposing on the source image signal and identify a left-eye image signal and a right-eye image signal. This embodiment is related to, for example, the 3D display based on the active shutter type technology, which divides a 3D image of each frame to form two groups of pictures corresponding to a left eye and a right eye, continually displays them in an alternate manner, and meanwhile, allows corresponding pictures to be seen by the left and right eyes at a proper timing by synchronously controlling shutters of a left-eye glass and a right-eye glass of 3D shutter glasses. That is, the 3D image of each frame practically contains one corresponding 2D left-eye image of one frame and a corresponding 2D right-eye image of one frame. Therefore, in order to correctly control the 3D shutter glasses in synchronization, it is necessary to correctly identify the left-eye image and the right-eye image for the 3D image of each frame.

When it is judged that the source image signal is the 3D image signal, the selecting unit 14 selects the 3D image signal or a 2D image signal for display. After it is judged that the source image signal is the 3D image signal, the display device notifies the user of making a selection. For example, a selection window for the user to select viewing of a 3D image or a 2D image is popped out, so that a further process and display for the source image signal can be conducted according to requirements or preferences of the user.

The display unit 15 acts to perform a 3D stereoscopic display by using the 3D image signal, which has been processed by the 3D image signal processing unit, in combination with 3D shutter glasses, or acts to perform a frame doubling process on the source image signal which is judged as a 2D image signal or the source image signal which is converted to the 2D image signal from the 3D image signal, and insert a black picture at the end of displaying 2D image of each frame.

In an example, the display unit 15 comprises a 2D-image frame-doubling-process module 151, a 3D-image-to-2D-image conversion module 152, a clock controlling module 153 and a black-insertion controlling module 154.

The 2D-image frame-doubling-process module 151 acts to perform the frame doubling process on the source image signal which is judged as a 2D image signal or the source image signal which is converted into a 2D image signal from the 3D image signal. The frame doubling process on the source image signal is performed by, for example, using a MEMC technology so as to increase the refreshing rate of 50 Hz/60 Hz of a common display device to, such as, 100 Hz/120 Hz. In this case, a display device having a refreshing rate larger than or equal to 120 Hz may be used, thereby enabling motion pictures to be more clear and fluent.

The 3D-image-to-2D-image conversion module 152 acts to convert the source image signal which has been judged as the 3D image signal and subject to decomposition and identification into the 2D image signal. Because there is a distance (with an average value of 6.5 cm) between two human eyes, left and right eyes have different relative positions with respect to a same object, which produces a binocular parallax, i.e., what are seen by the left and right eyes are images with difference therebetween. However, the difference is rather slight. In the embodiments of the present invention, for example, there are two exemplary methods for converting the 3D source image signal into the 2D image signal. The first method is to extract only the left-eye image or only the right-eye image corresponding to a 3D image of each frame for display. The second method is to perform a synthetic operation processing on the left-eye image and the right-eye image for the 3D image of each frame so as to generate a corresponding frame of 2D image. After conversion of the 3D source image signal into the 2D image signal, the frequency of the 2D image signal is half of that of the 3D source image signal.

The clock controlling module 153 acts to provide timing and synchronization controlling signals. Correct timing and synchronization controlling signals provided by the clock controlling module 153 assure a correct display of the display device.

The black-insertion controlling module 154 acts to insert a black picture at the end of displaying the 2D image of each frame, and also acts to insert a black picture at the end of displaying the left-eye image or the right-eye image of each frame. The black-insertion controlling module 154 applies a black-picture signal to each sub-pixel on a display screen simultaneously after it receives the clock signal from the clock controlling module 153, so that each sub-pixel on the whole screen is blackened at the same time. In the case of displaying of the 2D image signal, insertion of a black picture at the end of displaying the image of each frame, which is adopted on the basis of the frame doubling technology, resolves problems of blinking and tailing which are present in a display device, illuminates an edge blur phenomenon of images for fast motion pictures, corrects the "illusion" which is formed due to a visually temporary retention of human eyes, and effectively improves picture stability; and in the case of displaying of the 3D image signal, the display device adds a black inserting signal between the left-eye image and the right-eye image of each frame to shorten a vision temporary retention duration for displaying the image of the present frame, thereby eliminating a crosstalk phenomenon caused by simultaneous displaying of the left-eye image and the right-eye image in an existing active 3D technology.

Further, except for the above five units, the display device can further comprise, for example, 3D shutter glasses 16, which is used to receive the synchronization controlling signal provided by the clock controlling module and discern identification information of a left-eye image signal and a right-eye image signal, and to perform a shutter switching operation between a left-eye glass and a right-eye glass according to the identification information of the left-eye image signal and the right-eye image signal.

In an embodiment of the present invention, the input source image signal is transmitted through the judgment unit 12 for performing a judgment of the image signal after it has been undergone a decoding process with the video decoding unit 11 so as to judge whether the source image signal is a 2D image signal or a 3D image signal.

Figure 3:
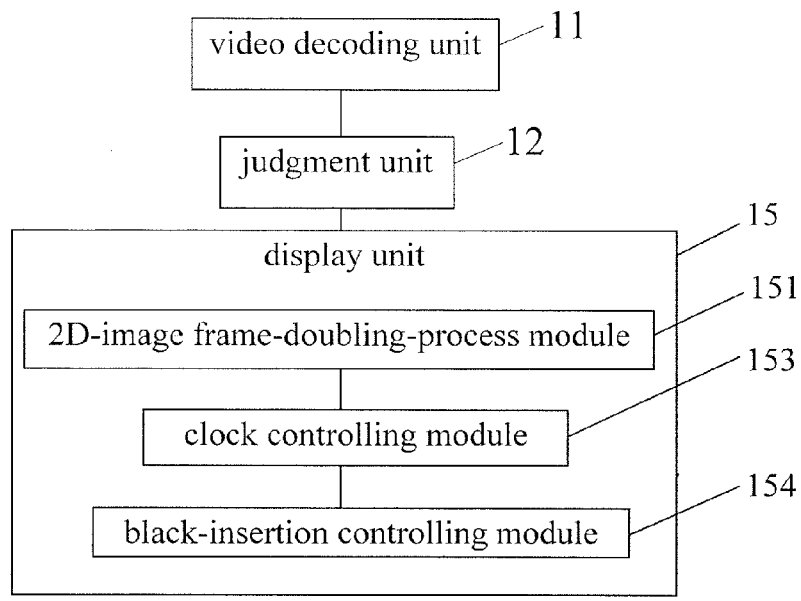
FIG. 3 is a schematic view showing a unit module for achieving a 2D display in an embodiment of the present invention.

As shown in FIG. 3, when the judgment unit 12 judges that the source image is a 2D image signal, the refreshing rate becomes two times the original one after the processing by the 2D-image frame-doubling-process module 151 in the display unit 15, and further, a stable 2D-image display effect without blinking and streaking can be viewed by the user, by performing a control by the clock controlling module 153 in cooperation with insertion of a black picture at the end of displaying the 2D image of each frame by the black-insertion controlling module 154.

When the judgment unit 12 judges that the source image is a 3D image signal, a left-eye image and a right-eye image of the 3D image signal are decomposed and identified by the 3D image signal process unit 13, and a prompt window, for example, is shown by the selecting unit 14 for user's selection.

Figure 4:
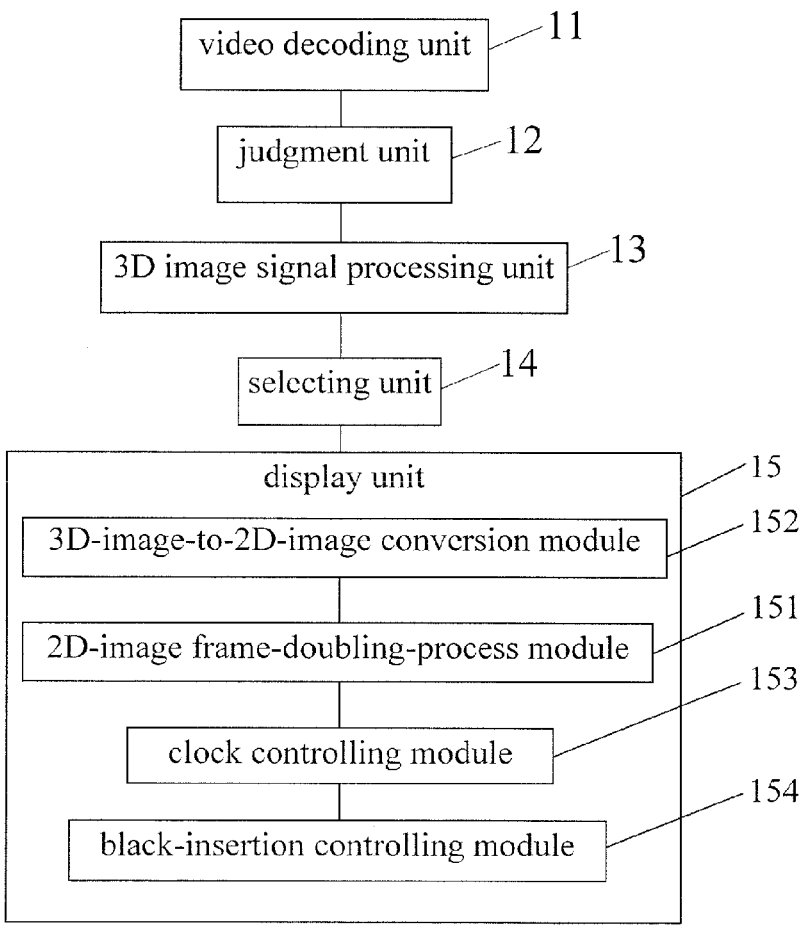
FIG. 4 is a schematic view showing a unit module for achieving a 3D display in an embodiment of the present invention.

As shown in FIG. 4, when 2D display is selected by a user, the 3D-image-to-2D-image conversion module 152 converts the 3D image subject to the decomposition and identification into a 2D image, and further, the refreshing rate becomes two times the original one after the processing by the 2D-image frame-doubling-process module 151, and a stable 2D-image display effect without blinking and streaking can be viewed by the user, by performing a control by the clock controlling module 153 in cooperation with the insertion of a black picture at the end of displaying the 2D image of each frame with the black-insertion controlling module 154.

Furthermore, the refreshing rate of the display device is, for example, larger than or equal to 120 Hz. The display device of the embodiment can cooperate with 3D shutter glasses to realize a 3D stereoscopic display. To make sure that a continual 3D image effect without blinking is seen by the user, display duration for one frame of 3D image is preferably smaller than a 1/60 second, i.e., images at a frequency of 60 Hz or more are received by each of the left eye and the right eye. While in an active type 3D technology, a 3D image of each frame contains a frame of 2D left-eye image and a frame of 2D right-eye image, and thus, the refreshing rate of the display device is preferably larger than or equal to 120 Hz. Additionally, under a display condition of a higher refreshing rate, display pictures will be more fluent and images will be more stable.

Figure 5:
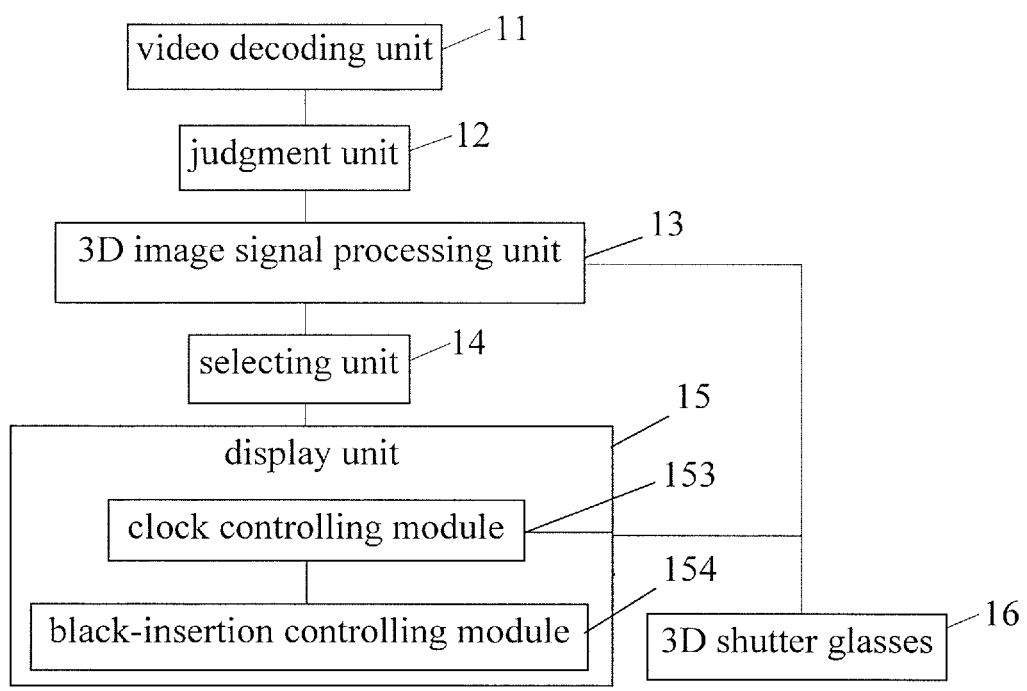
FIG. 5 is schematic view showing a unit module for achieving a 3D-2D mode switching display in an embodiment of the present invention.

As shown in FIG. 5, when 3D display is selected by the user, the 3D shutter glasses 16 perform corresponding turning-on and turning-off operations according to a synchronization controlling signal provided by the timing controlling module 153 in the display unit 15 and identification information for the left-eye image and the right-eye image identified by the 3D image signal process unit 13, which eliminates a cross-talk phenomenon caused by simultaneous displaying of the left-eye image and the right-eye image in an existing active type 3D technology in cooperation with insertion of a black picture between the left-eye image and the right-eye image of each frame by the black-insertion controlling module 154.

Still further, the display device of the embodiment is applicable to a liquid crystal display, an Organic Light Emitting Diode (OLED) display, a Light Emitting Diode (LED) display, a Plasma Display Panel (PDP) display and other active-type switch-scanning display capable of working in cooperation with 3D shutter glasses.

According to the technical solutions of the embodiment, there is provided a display device, which performs 2D display when the input source signal is a 2D image signal, and can perform 3D or 2D display according to requirements and preferences of the user. The utilization ratio of a 3D stereoscopic display device in the case in which at present 3D image resources are small is increased, thereby enhancing market demands for the 3D stereoscopic display device and form a basis for fully spreading of the 3D display technology.

The descriptions made above are merely the specific embodiments of the present invention, but the protection scope of the present invention is not limited thereto. Modifications or replacements, which are easily conceived by those skilled in the art within the technical scope disclosed by the present invention, should be embraced within the protection scope of the present invention. Therefore, the protection scope of the present invention is defined by the protection scope of attached claims.

The invention claimed is:

1. A display method, comprising:
providing a source image signal and judging whether the source image signal is a two-dimensional (2D) signal or a three-dimensional (3D) signal;
when it is judged that the source image signal is a 2D image signal comprising frames of image, at least one of which is not a black picture, performing a frame doubling process on the source image signal and inserting a black picture at the end of displaying each frame of image for all the frames of image by applying a black-picture signal to each sub-pixel on a display screen simultaneously; and
when it is judged that the source image signal is a 3D image signal, performing an image decomposition and identification on the source image signal, judging whether 3D display or 2D display is selected by a user, performing 3D stereoscopic display in combination with 3D shutter glasses if 3D display is selected; and converting the source image signal subject to the image decomposition and identification into a 2D image signal comprising frames of image, at least one of which is not a black picture, performing the frame doubling process and inserting a black picture at the end of displaying each frame of image for all the frames of image by applying a black-picture signal to each sub-pixel on a display screen simultaneously if 2D display is selected;
wherein upon the performing of the 3D stereoscopic display in combination with the 3D shutter glasses, when a left-eye image for a frame of 3D image is displayed, four timings are included:
at a first timing, in which a left-eye glass and a right-eye glass are both in an off state, and a display device starts to scan and display the left-eye image of a present frame before the left-eye glass is opened;
at a second timing, in which the left-eye glass is opened, the right-eye glass is in the off state, and the display device continues to scan and display the left-eye image of the present frame, wherein the left-eye glass is not opened until the display device scans and displays the left-eye image of the present frame for a time period that is equal to a time difference between the second timing and the first timing, and the time difference between the second timing and the first timing is prolonged to reduce non-uniform luminance between an upper part and a lower part of the display screen;
at a third timing, in which the left-eye glass is in an on state, the right-eye glass is in the off state, and the display device completes scanning of the left-eye image of the present frame and continues to display the left-eye image of the present frame; and
at a fourth timing, in which the left-eye glass and the right-eye glass both are in the off state, and the display device displays a black picture.

2. The display method claimed as claim 1, wherein upon the performing of the 3D stereoscopic display in combination with the 3D shutter glasses, when a right-eye image for the frame of 3D image is displayed, four timings are included:
  at a fifth timing, in which a left-eye glass and a right-eye glass both are in an off state, and a display device starts to scan and display the right-eye image of a present frame;
  at a sixth timing, in which the left-eye glass is in the off state, the right-eye glass is turned on, and the display device continues to scan and display the right-eye image of the present frame;
  at a seventh timing, in which the left-eye glass is in the off state, the right-eye glass is in an on state, and the display device displays the right-eye image of the present frame's image; and
  at an eighth timing, in which the left-eye glass and the right-eye glass both are in the off state, and the display device displays a black picture.

3. The display method claimed as claim 1, wherein display duration for one frame of 3D image is smaller than or equal to a 1/60 second.

4. The display method claimed as claim 1, wherein display duration for one frame of 3D image is smaller than or equal to a 1/60 second.

5. The display method claimed as claim 2, wherein display duration for one frame of 3D image is smaller than or equal to a 1/60 second.

6. The display method claimed as claim 1, wherein upon the performing of the 3D stereoscopic display in combination with the 3D shutter glasses, when a right-eye image for the frame of 3D image is displayed, four timings are included:
  at a fifth timing, in which a left-eye glass and a right-eye glass both are in an off state, and a display device starts to scan and display the right-eye image of a present frame before the right-eye glass is opened;
  at a sixth timing, in which the left-eye glass is in the off state, the right-eye glass is opened, and the display device continues to scan and display the right-eye image of the present frame, wherein the right-eye glass is not opened until the display device scans and displays the right-eye image of the present frame for a time period that is equal to a time difference between the sixth timing and the fifth timing;
  at a seventh timing, in which the left-eye glass is in the off state, the right-eye glass is in an on state, and the display device displays the right-eye image of the present frame's image; and
  at an eighth timing, in which the left-eye glass and the right-eye glass both are in the off state, and the display device displays a black picture.

7. A display device, comprising:
  a judgment unit configured to judge whether a source image signal is a 2D image signal or a 3D image signal;
  a 3D image signal processing unit configured to perform an image decomposition on the source image signal and identifying as a left-eye image signal and a right-eye image signal, when it is judged that the source image signal is the 3D image signal,
  a selecting unit configured to select a display with the 3D image signal or a display with the 2D image signal, when it is judged that the source image signal is the 3D image signal; and
  a display unit configured to perform a 3D stereoscopic display by using the 3D image signal, which has been processed by the 3D image signal processing unit, in combination with 3D shutter glasses, or for performing a frame doubling process on the source image signal which is judged as the 2D image signal or the source image signal which is converted into a 2D image signal from the 3D image signal, the 2D image signal comprising frames of image, at least one of which is not a black picture, and inserting a black picture at the end of displaying each frame's 2D picture for all the frames' 2D picture by applying a black-picture signal to each sub-pixel on a display screen simultaneously;
  wherein upon the display unit performing the 3D stereoscopic display in combination with the 3D shutter glasses, when a left-eye image for a frame of 3D image is displayed, four timings are included:
  at a first timing, in which a left-eye glass and a right-eye glass are both in an off state, and a display device starts to scan and display the left-eye image of a present frame before the left-eye glass is opened;
  at a second timing, in which the left-eye glass is opened, the right-eye glass is in the off state, and the display device continues to scan and display the left-eye image of the present frame, wherein the left-eye glass is not opened until the display device scans and displays the left-eye image of the present frame for a time period that is equal to a time difference between the second timing and the first timing, and the time difference between the second timing and the first timing is prolonged to reduce non-uniform luminance between an upper part and a lower part of the display screen;
  at a third timing, in which the left-eye glass is in an on state, the right-eye glass is in the off state, and the display device completes scanning of the left-eye image of the present frame and continues to display the left-eye image of the present frame; and
  at a fourth timing, in which the left-eye glass and the right-eye glass both are in the off state, and the display device displays a black picture.

8. The display device claimed as claim 7, wherein the display device comprises:
  a 2D-image frame-doubling-process module configured to perform the frame doubling process on the source image signal which is judged as the 2D image signal or the source image signal which is converted into the 2D image signal from the 3D image signal; and
  a black-insertion controlling module configured to insert the black picture at the end of displaying each frame's 2D image for all the frames' 2D picture.

9. The display device claimed as claim 7, wherein the display device further comprises:
  a 3D-image-to-2D-image conversion module configured to convert the source image signal, which is judged as the 3D image signal and is subject to the decomposition and the identification, into the 2D image signal.

10. The display device claimed as claim 8, wherein the black-insertion controlling module is also used to insert the black picture at the end of displaying of a left-eye image or a right-eye image of each frame upon the performing of the 3D display.

11. The display device claimed as claim 7, further comprising:
  the 3D shutter glasses for receiving a synchronization controlling signal provided by a clock controlling module and identification information for discerning the left-eye image signal and the right-eye image signal, and performing a shutter switching operation between a left-eye glass and a right-eye glass according to the identification information for the left-eye image signal and the right-eye image signal.

12. The display device claimed as claim 7, wherein a refreshing rate of the display device is larger than or equal to 120 Hz.

13. A display method, comprising:
- providing a source image signal and judging whether the source image signal is a two-dimensional (2D) signal or a three-dimensional (3D) signal;
- when it is judged that the source image signal is a 2D image signal comprising frames of image, at least one of which is not a black picture, performing a frame doubling process on the source image signal and inserting a black picture at the end of displaying each frame of image for all the frames of image by applying a black-picture signal to each sub-pixel on a display screen simultaneously; and
- when it is judged that the source image signal is a 3D image signal, performing an image decomposition and identification on the source image signal, judging whether 3D display or 2D display is selected by a user, performing 3D stereoscopic display in combination with 3D shutter glasses if 3D display is selected; and converting the source image signal subject to the image decomposition and identification into a 2D image signal comprising frames of image, at least one of which is not a black picture, performing the frame doubling process and inserting a black picture at the end of displaying each frame of image for all the frames of image by applying a black-picture signal to each sub-pixel on a display screen simultaneously if 2D display is selected,
- wherein directly after the black-picture signal is applied to each of the sub-pixels simultaneously when the 2D display is selected, then each of the sub-pixels are all black at the end of each of the respective displayed frame of image;
- wherein upon the performing of the 3D stereoscopic display in combination with the 3D shutter glasses, when a left-eye image for a frame of 3D image is displayed, four timings are included:
- at a first timing, in which a left-eye glass and a right-eye glass are both in an off state, and a display device starts to scan and display the left-eye image of a present frame before the left-eye glass is opened;
- at a second timing, in which the left-eye glass is opened, the right-eye glass is in the off state, and the display device continues to scan and display the left-eye image of the present frame, wherein the left-eye glass is not opened until the display device scans and displays the left-eye image of the present frame for a time period that is equal to a time difference between the second timing and the first timing, and the time difference between the second timing and the first timing is prolonged to reduce non-uniform luminance between an upper part and a lower part of the display screen;
- at a third timing, in which the left-eye glass is in an on state, the right-eye glass is in the off state, and the display device completes scanning of the left-eye image of the present frame and continues to display the left-eye image of the present frame; and
- at a fourth timing, in which the left-eye glass and the right-eye glass both are in the off state, and the display device displays a black picture.

* * * * *